United States Patent
Rhodes et al.

(10) Patent No.: US 10,392,018 B1
(45) Date of Patent: Aug. 27, 2019

(54) VEHICLE AND REGENERATIVE BRAKING CONTROL SYSTEM FOR A VEHICLE

(71) Applicant: FORD GLOBAL TECHNOLOGIES, LLC, Dearborn, MI (US)

(72) Inventors: Kevin James Rhodes, Dearborn, MI (US); William David Treharne, Ypsilanti, MI (US); Charles K. Evans, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/144,630

(22) Filed: Sep. 27, 2018

(51) Int. Cl.
| | |
|---|---|
| *B60W 10/26* | (2006.01) |
| *B60L 7/16* | (2006.01) |
| *B60W 30/18* | (2012.01) |
| *B60W 10/30* | (2006.01) |
| *B60W 20/14* | (2016.01) |
| *B60L 1/00* | (2006.01) |
| *B60L 1/12* | (2006.01) |
| *B60L 58/12* | (2019.01) |

(52) U.S. Cl.
CPC ....... *B60W 30/18127* (2013.01); *B60L 1/003* (2013.01); *B60L 1/12* (2013.01); *B60L 7/16* (2013.01); *B60L 58/12* (2019.02); *B60W 10/26* (2013.01); *B60W 10/30* (2013.01); *B60W 20/14* (2016.01); *B60W 2510/244* (2013.01); *B60W 2510/246* (2013.01); *B60W 2550/12* (2013.01)

(58) Field of Classification Search
CPC ....... B60W 10/196; B60W 10/30; B60L 1/00; B60L 1/02; B60L 7/10; B60L 7/18; B60H 1/00385; B60H 1/00392; B60H 1/004
USPC ............................................... 180/165, 65.28
See application file for complete search history.

(56) References Cited

U.S. PATENT DOCUMENTS

| | | | | | |
|---|---|---|---|---|---|
| 5,291,960 | A * | 3/1994 | Brandenburg | ..... | B60H 1/00492 180/65.27 |
| 5,507,153 | A * | 4/1996 | Seto | .................. | B60H 1/00392 62/133 |
| 5,555,737 | A * | 9/1996 | Takeo | ................ | B60H 1/00392 62/230 |
| 6,040,561 | A * | 3/2000 | Murty | ................ | B60H 1/00392 219/494 |
| 7,143,596 | B2 * | 12/2006 | Yonekura | ........... | B60H 1/00421 62/236 |
| 7,213,665 | B2 * | 5/2007 | Yamaguchi | ............ | B60K 6/445 180/65.27 |

(Continued)

*Primary Examiner* — Jeffrey J Restifo
(74) *Attorney, Agent, or Firm* — David Kelley; Brooks Kushman P.C.

(57) ABSTRACT

A vehicle includes an electric machine, a coolant circuit, a refrigerant circuit, and a controller. The electric machine is configured to charge a battery via regenerative braking. The coolant circuit has an electric heater. The refrigerant circuit has an electric compressor. The controller is programmed to, responsive to a capacity of the battery to receive power being less available regenerative braking power and ambient air temperature being less than a first threshold, direct regenerative braking power to the heater but not the compressor. The controller is further programmed to, responsive to the capacity of the battery to receive power being less available regenerative braking power and ambient air temperature exceeding a second threshold that is greater than the first threshold, direct regenerative braking power to the compressor but not the heater.

20 Claims, 4 Drawing Sheets

(56) References Cited

U.S. PATENT DOCUMENTS

| | | | | |
|---|---|---|---|---|
| 7,380,586 B2* | 6/2008 | Gawthrop | B60H 1/004 | 165/202 |
| 7,552,705 B2* | 6/2009 | Serkh | B60K 6/28 | 123/179.4 |
| 7,600,391 B2* | 10/2009 | Naik | B60H 1/3208 | 62/238.6 |
| 7,621,262 B2* | 11/2009 | Zubeck | B60K 6/442 | 123/543 |
| 8,052,066 B2* | 11/2011 | Watanabe | B60H 1/004 | 237/12.3 B |
| 8,119,300 B2* | 2/2012 | Tsuchiya | B60H 1/00385 | 429/434 |
| 8,127,564 B2* | 3/2012 | Takamatsu | B60K 11/02 | 62/239 |
| 8,242,737 B2* | 8/2012 | Bito | B60K 6/46 | 320/104 |
| 8,620,506 B2* | 12/2013 | Kummer | H01M 10/443 | 701/22 |
| 8,630,759 B2* | 1/2014 | Bauerle | B60L 7/18 | 701/22 |
| 8,639,413 B2* | 1/2014 | Endo | B60H 1/00392 | 701/29.2 |
| 8,662,220 B2* | 3/2014 | Burkholder | B60W 10/06 | 180/65.275 |
| 8,850,834 B2* | 10/2014 | Markowitz | B60H 1/005 | 62/244 |
| 9,014,889 B2* | 4/2015 | Ando | B60W 10/08 | 701/22 |
| 9,020,674 B2* | 4/2015 | Gregg | B60L 58/12 | 701/22 |
| 9,090,144 B2* | 7/2015 | Momose | B60H 1/00428 | |
| 9,114,686 B2* | 8/2015 | Hashigaya | B60H 1/00428 | |
| 9,114,709 B2* | 8/2015 | Stanek | B60L 1/003 | |
| 9,114,794 B2* | 8/2015 | King | B60H 1/00278 | |
| 9,114,802 B2* | 8/2015 | Rudberg | B60T 13/586 | |
| 9,321,463 B2* | 4/2016 | Nakamura | B60W 30/18127 | |
| 9,337,680 B2* | 5/2016 | Gibeau | H01M 10/443 | |
| 9,586,485 B2* | 3/2017 | Badger | B60L 7/18 | |
| 9,598,072 B2* | 3/2017 | Aoki | B60W 10/30 | |
| 9,604,521 B2* | 3/2017 | Hirabayashi | F02D 41/068 | |
| 9,630,626 B2* | 4/2017 | Johri | B60L 7/10 | |
| 9,776,469 B1* | 10/2017 | Smith | B60H 1/004 | |
| 9,780,422 B2* | 10/2017 | Dunn | B60H 1/00278 | |
| 9,789,765 B2* | 10/2017 | Miller | B60L 1/02 | |
| 9,796,385 B2* | 10/2017 | Krueger | B60W 10/184 | |
| 9,815,373 B2* | 11/2017 | Perkins | B60L 1/003 | |
| 9,827,846 B2* | 11/2017 | Porras | B60K 11/04 | |
| 9,863,671 B2* | 1/2018 | Ragazzi | F25B 13/00 | |
| 9,878,703 B2* | 1/2018 | Kava | B60L 7/16 | |
| 10,036,288 B2* | 7/2018 | Leone | F01M 5/001 | |
| 10,106,012 B2* | 10/2018 | Umehara | B60H 1/00278 | |
| 10,118,460 B1* | 11/2018 | Blatchley | B60H 1/004 | |
| 10,118,493 B2* | 11/2018 | Nada | B60L 1/003 | |
| 10,124,651 B2* | 11/2018 | Blatchley | B60H 1/034 | |
| 10,160,443 B2* | 12/2018 | Sugimoto | B60L 58/12 | |
| 10,252,597 B2* | 4/2019 | Wallace | B60H 1/00342 | |
| 10,293,654 B2* | 5/2019 | Treharne | B60H 1/00278 | |
| 10,293,706 B2* | 5/2019 | Porras | B60L 58/24 | |
| 10,302,346 B2* | 5/2019 | Ragazzi | F25B 30/02 | |

\* cited by examiner

VEHICLE AND REGENERATIVE BRAKING CONTROL SYSTEM FOR A VEHICLE

TECHNICAL FIELD

The present disclosure relates to hybrid/electric vehicles and regenerative braking control systems for hybrid/electric vehicles.

BACKGROUND

Hybrid/electric vehicles may include electric machines that are configured to convert kinetic energy into electrical energy via regenerative braking.

SUMMARY

A vehicle includes an electric machine, a coolant circuit, a refrigerant circuit, and a controller. The electric machine is configured to charge a battery via regenerative braking. The coolant circuit has an electric heater. The refrigerant circuit has an electric compressor. The controller is programmed to, responsive to a capacity of the battery to receive power being less available regenerative braking power and ambient air temperature being less than a first threshold, direct regenerative braking power to the heater but not the compressor. The controller is further programmed to, responsive to the capacity of the battery to receive power being less available regenerative braking power and ambient air temperature exceeding a second threshold that is greater than the first threshold, direct regenerative braking power to the compressor but not the heater.

A vehicle includes an electric machine, an electric heater, a refrigerant compressor, and a controller. The electric machine is configured to charge a battery during regenerative braking. The controller is programmed to, responsive to ambient air temperature being less than a lower threshold and an unchargeable condition of the battery, direct regenerative braking power to the heater. The controller is further programmed to, responsive to ambient air temperature exceeding an upper threshold and presence of the condition, direct regenerative braking power to the compressor.

A vehicle includes an electric machine, an electric heater, a refrigerant compressor, and a controller. The electric machine is configured to generate electric power during regenerative braking. The controller is programmed to, responsive to ambient air temperature being less than a first threshold, direct regenerative braking power to the heater but not the compressor. The controller is further programmed to, responsive to ambient air temperature exceeding a second threshold that is greater than the first threshold, direct regenerative braking power to the compressor but not the heater.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
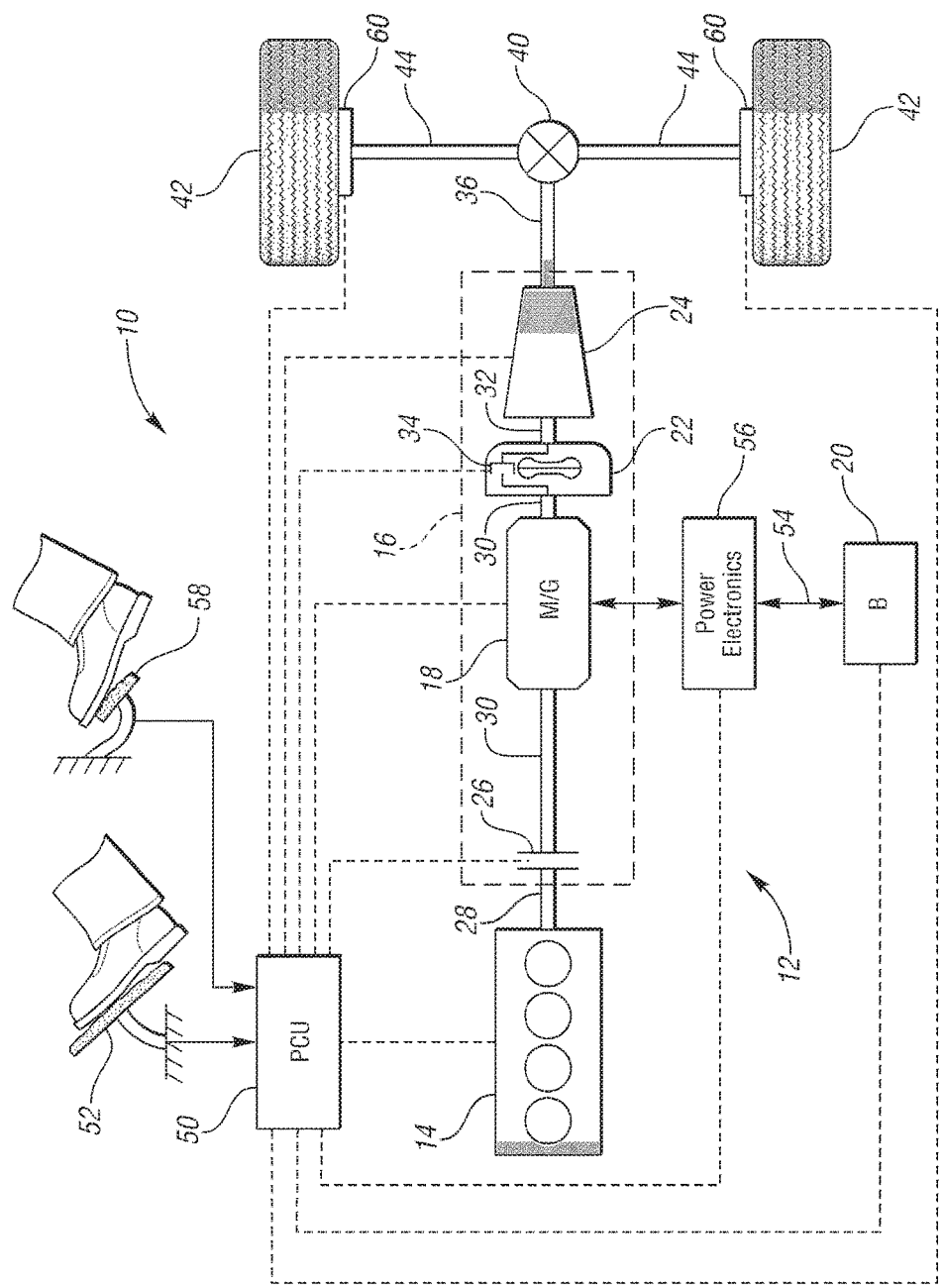
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interruptdriven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
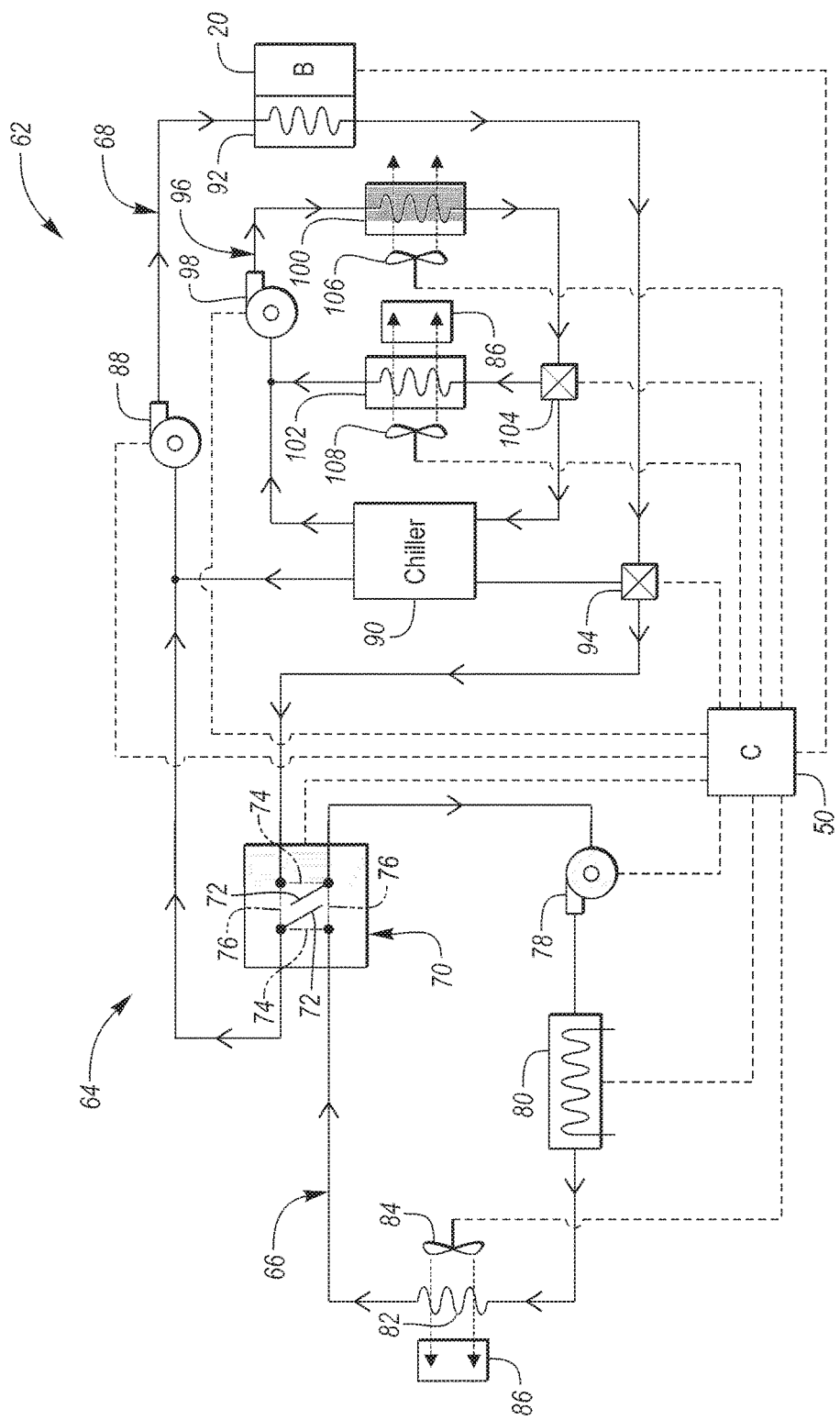
FIG. 2 is schematic illustration of a representative heating and cooling system that is configured to heat and/or cool various components of the vehicle.

Referring to FIG. 2, a representative heating and cooling system 62 that is configured to heat and/or cool various components of the vehicle 10 is illustrated. The heating and cooling system 62 includes coolant circuit 64. The coolant circuit 64 may be divided into a first sub circuit 66 and a second sub circuit 68. The coolant circuit 64 is configured to circulate a coolant, such as water or glycol, to various subcomponents of the vehicle 10 in order to heat or cool the various subcomponents. The first sub circuit 66 and the second sub circuit 68 may be connected to each other by a valve 70. The valve 70 may include switching elements 72 that are configured to switch between first positions 74 and second positions 76. If the switching elements 72 are in the first positions 74, the first sub circuit 66 is connected to the second sub circuit 68 such that the first sub circuit 66 and second sub circuit 68 are in series and operate as a single coolant circuit. If the switching elements 72 are in the second positions 76, then the first sub circuit 66 and second sub circuit 68 are isolated from each other and operate as separate coolant circuits.

The first sub circuit 66 includes a pump 78 that is configured to circulate the coolant through the first sub circuit 66, an electric heater 80 (such as a positive temperature coefficient or PTC heater), and a heat exchanger 82. A fan 84 may be configured to direct air across the heat exchanger 82 in order to heat air that is being directed into a cabin 86 of the vehicle 10. The controller 50 may be configured to operate the pump 78, the electric heater 80, and/or the fan 84 in order to provide heating to the cabin 86 in response to a request from a vehicle operator to heat the cabin 86. The vehicle operator may request cabin heating by operating a control panel (not shown). The battery 20 is configured to provide electrical power to operate the pump 78, electric heater 80, and the fan 84 through various electrical connections (not shown).

The second sub circuit 68 includes a pump 88, a chiller 90, and a heat exchanger 92 that is configured to heat or cool the battery 20. The heat exchanger 92 may be a separate component that is adjacent to the battery 20 or may be subcomponents of and integral to the battery 20. For example, the heat exchanger 92 may comprise a tube and fin heat exchanger that is adjacent to the battery 20, and a fan (not shown) may be configured to direct air across the heat exchanger 92 and the battery 20 in order to heat or cool the battery. In an alternative embodiment, the heat exchanger 92 may comprise one or more conduits that are part of the second sub circuit 68 and are integral to the structure of the battery 20. In this alternative embodiment heat is exchanged directly between the coolant within the conduits and the battery 20 in order to heat or cool the battery 20.

In a mode where heating of the battery 20 is desired, the chiller 90 may be isolated from the second sub circuit 68 by closing a valve 94, and the switching elements 72 of valve 70 may be adjusted to the first positions 74 such that the first sub circuit 66 and second sub circuit 68 operate as a single coolant circuit, allowing heat to be transferred from the electric heater 80 to the battery 20 via heat exchanger 92. In a mode where cooling of the battery 20 is desired, valve 94 is opened such that the chiller 90 is not isolated from the second sub circuit 68, and the switching elements 72 of valve 70 may be adjusted to the second positions 76 in order to isolate the first sub circuit 66 from the second sub circuit 68, preventing heat from being transferred from electric heater 80 to the battery 20. The controller 50 may be configured to operate the pump 88, valve 94, and a fan (if included) that directs air across the heat exchanger 92. The battery 20 is configured to provide electrical power to operate the pump 88, valve 94, and the fan (if included) that directs air across the heat exchanger 92 through various electrical connections (not shown).

The chiller 90 is a heat exchanger that is configured to transfer heat from the second sub circuit 68 to a refrigerant circuit 96. Transferring the heat from the coolant within the second sub circuit 68 to the refrigerant circuit 96 reduces the temperature of the coolant within the first sub circuit 68 such that the coolant may be utilized to cool the battery 20 via heat exchanger 92. The refrigerant circuit 96 includes a refrigerant compressor 98, a condenser 100, an evaporator 102, and a thermal expansion valve 104. Parallel refrigerant lines may run through the chiller 90 and the evaporator 102. The thermal expansion valve 104 may be a two-way thermal expansion valve that is configured to direct coolant to both the chiller 90 and the evaporator 102 simultaneously. The thermal expansion valve may also be configured to individually isolate the chiller 90 or evaporator 102 from the refrigerant circuit 96. A first fan 106 may be configured to direct air across the condenser 100 in order to reject heat from the refrigerant circuit 96 to the ambient surroundings. A second fan 108 may be configured to direct air across the evaporator 102 in order to cool air that is being directed into the cabin 86. The controller 50 may be configured to operate the refrigerant compressor 98, the thermal expansion valve 104, the first fan 106, and/or second fan 108 in order to cool the battery 20 and/or to provide cooling to the cabin 86 in response to a request from the vehicle operator to cool the cabin 86. The vehicle operator may request cabin cooling by operating a control panel (not shown). The battery 20 is configured to provide electrical power to operate the refrigerant compressor 98, the thermal expansion valve 104, the first fan 106, and/or the second fan 108 through various electrical connections (not shown).

The refrigerant compressor 98 and the electric heater 80 may be referred to as high-voltage or primary loads while the valve 70, pump 78, the fan 84, pump 88, valve 94, the fan (if included) that directs air across the heat exchanger 92, thermal expansion valve 104, the first fan 106, second fan 108, vehicle lights (including headlights, brake lights, backup lights, turn signals, etc.), radio, heated windscreens (e.g., thermal resistance elements utilized to defrost windows), and various other subcomponents may be referred to as secondary or low-voltage loads. The high-voltage loads utilize significantly more electrical power relative to the low-voltage loads. For example, the refrigerant compressor 98 and the electric heater 80 may each require approximately 6000 watts in to operate while the various fans may require approximately 600 watts to operate, the various pumps require approximately 75 watts to operate, and the various vehicle lights require approximately 50 watts to operate.

During a regenerative braking operation where it is not desirable to further charge the battery 20 (e.g., where the battery 20 is fully charged), the regenerative braking energy may be directed to the electric heater 80 or to the refrigerant compressor 98 to respectively heat or cool the coolant within the coolant circuit 64. While the regenerative braking energy is being directed to operate either the electric heater 80 or the refrigerant compressor 98, the battery 20 may operate as a thermal battery to absorb the heat from the coolant within the coolant circuit 64 that is being generated by the electric heater 80 or to dissipate heat into the coolant within the coolant circuit 64 when the refrigerant compressor 98 is operating to cool the coolant. When the battery 20 is also operating as a thermal battery, it is important to maintain the battery temperature within a desirable range between a minimum and a maximum operating temperature, because if the temperature of the battery 20 is allowed to significantly increase or decrease outside of normal operating temperatures, the functionality (e.g., the ability of the battery to store a charge, the discharge power output limits of the battery, the discharge current limits of the battery, etc.) of the battery 20 deteriorates.

Figure 3A:
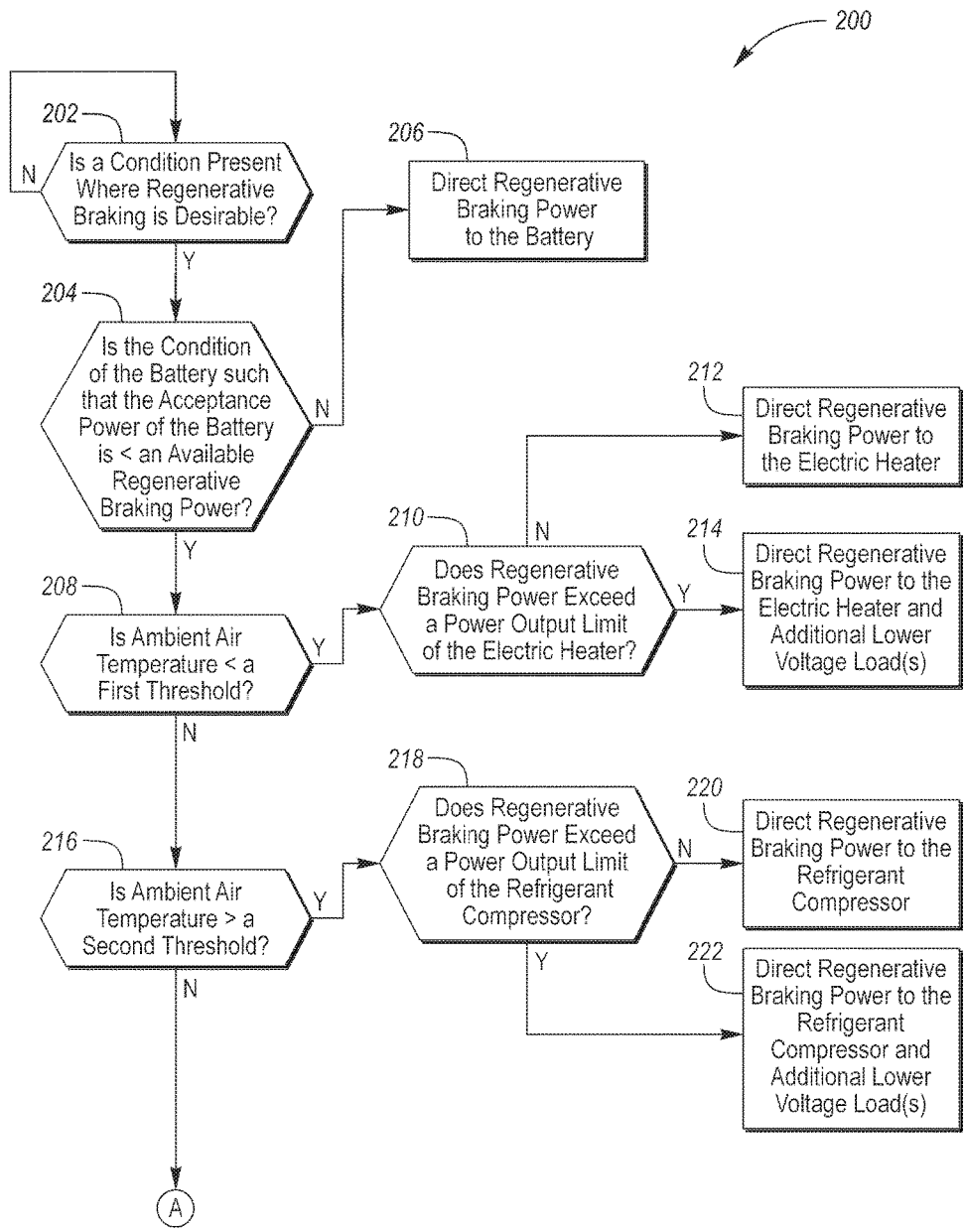
FIGS. 3A and 3B illustrate a flowchart of a method for controlling a regenerative braking system of the vehicle.
Figure 3B:
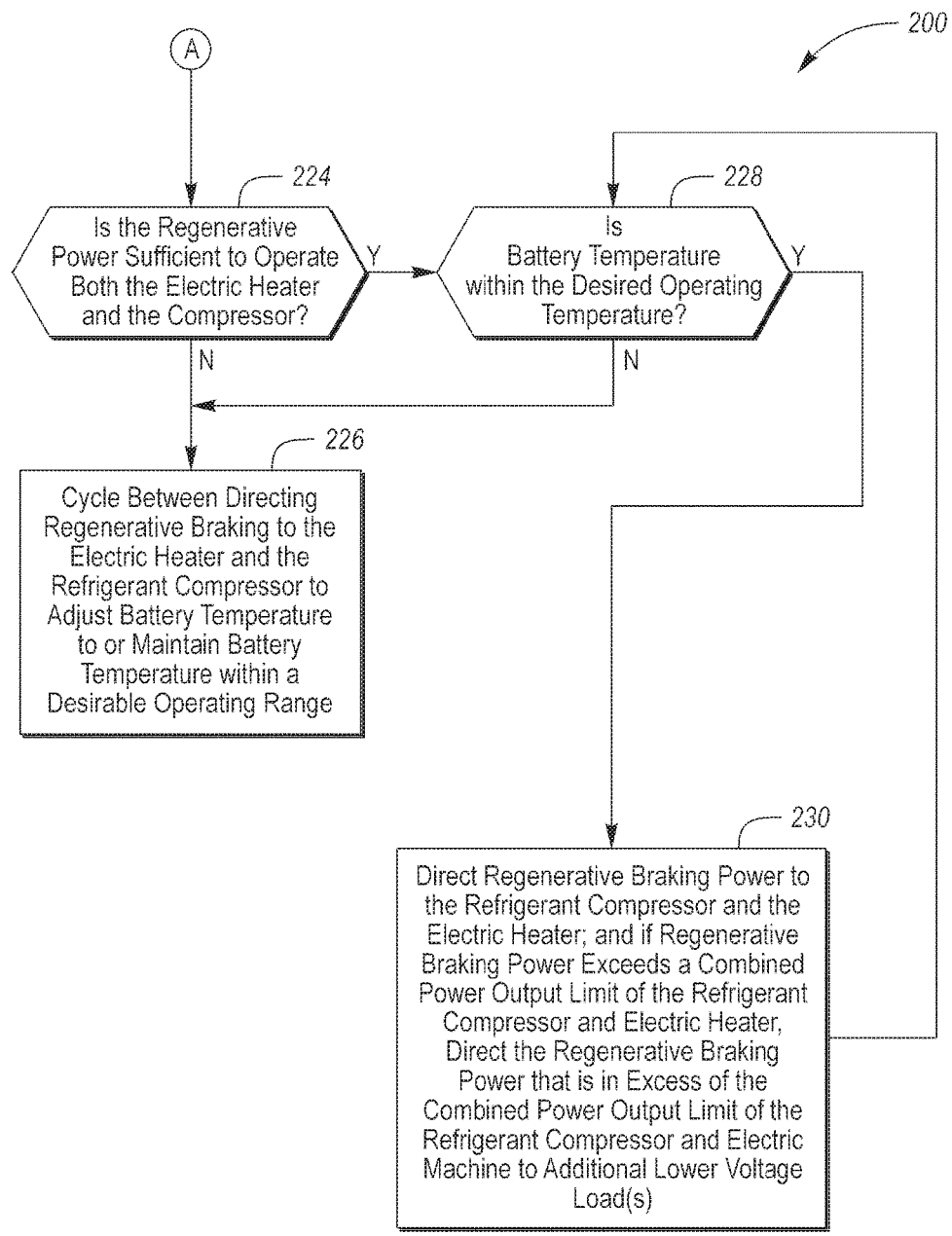

Referring to FIGS. 3A and 3B, a method 200 of controlling the regenerative braking system of the vehicle 10 is illustrated. The method 200 may be stored as control logic and/or an algorithm within the controller 50. The controller 50 may implement the method 200 by controlling the various components of the vehicle 10. The method 200 is initiated at block 202, where it is determined if a condition is present where regenerative braking is desirable. A condition where regenerative braking is desirable may be a condition where the friction brakes 60 are overheating, where the friction brakes 60 may be likely to overheat (e.g., while traveling on steep downgrade), where the friction brakes 60 are significantly worn, or to simply decrease the wear and tear of the friction brakes. If a condition is not present where regenerative braking is desirable, the method 200 recycles back to the beginning of block 202. If a condition is present where regenerative braking is desirable, the method 200 moves on to block 204, where it is determined if the condition of the battery 20 is such that the acceptance power (i.e., the capacity at which the battery is currently capable of receiving power in order to charge the battery 20) is less than the available regenerative braking power (i.e., the regenerative braking power that the vehicle is capable of generating under the current conditions). A condition of the battery 20 where the acceptance power of the battery 20 is less than the available regenerative braking power may include a condition where the battery charge is at or has exceeded a charge limit such that it is unable to receive additional charge (e.g., the battery 20 is fully charged), a condition where the battery has not exceeded the charge limit but is sufficiently close to the charge limit to such that the acceptance power of the battery is less than the available regenerative braking power, a condition where the battery temperature has exceeded an upper temperature limit, a condition where the battery temperature is less than a lower temperature limit, a condition where the battery has malfunctioned, a fault condition of the battery, etc. If the condition of the battery 20 is not such that the acceptance power of the battery 20 is less than the available regenerative braking power, the method 200 moves on to block 206 where the regenerative braking power is directed to the battery 20. Regenerative braking power may be directed to the battery 20 at any ambient temperature if the condition of the battery 20 is not such that the acceptance power of the battery 20 is less than the available regenerative braking power.

If the condition of the battery 20 is such that the acceptance power of the battery is less than the available regenerative braking power, the method 200 moves on to block 208 where it is determined if the ambient air temperature is less than a first threshold (or lower threshold). If the ambient air temperature is lower than the first threshold, the method 200 moves on to block 210 where it is determined if the regenerative braking power exceeds a power output limit of the electric heater 80. If the regenerative braking power does not exceed the power output limit of the electric heater 80, the method 200 moves on to block 212 where the regenerative braking power is directed to the electric heater 80 but not to the refrigerant compressor 98. It should also be noted that at block 212 that the regenerative braking power is directed to one of the high-voltage loads (i.e., the electric heater 80) alone, and there is not a command to operate any of the low-voltage loads (e.g., the valve 70, pump 78, fan 84, pump 88, valve 94, fan that directs air across the heat exchanger 92, thermal expansion valve 104, first fan 106, second fan 108, vehicle lights, radio, heated windscreens etc.) that are not already operating according to their intended purpose.

Returning to block 210, if the regenerative braking power does exceed the power output limit of the electric heater 80, the method 200 moves on to block 214 where the regenerative braking power is directed to the electric heater 80 and one or more of the low-voltage loads (e.g., the valve 70, pump 78, fan 84, pump 88, valve 94, fan that directs air across the heat exchanger 92, thermal expansion valve 104, first fan 106, second fan 108, vehicle lights, radio, heated windscreens, etc.), but not to the refrigerant compressor 98. The combination of the electric heater 80 and the one or more low-voltage loads at block 214 may utilize all of the regenerative braking power. The selection of which low-voltage loads may be dependent on the amount of regenerative braking power that is in excess of what the electric heater 80 is capable of consuming. For example, if the excess regenerative braking power is approximately 50 watts the excess regenerative braking power may be directed to the vehicle lights, or if the excess regenerative braking power is approximately 600 watts the excess regenerative braking power may be directed to one of the fans depicted in FIG. 2.

Returning to block 208, if the ambient air temperature is not less than the first threshold, the method 200 moves on to block 216 where it is determined if the ambient air temperature is greater than a second threshold (or upper threshold), the second threshold being greater than the first threshold (or lower threshold). If the ambient air temperature is greater than the second threshold, the method 200 moves on to block 218 where it is determined if the regenerative braking power exceeds a power output limit of the refrigerant compressor 98. If the regenerative braking power does not exceed the power output limit of the refrigerant compressor 98, the method 200 moves on to block 220 where the regenerative braking power is directed to the refrigerant compressor 98 but not to the electric heater 80. It should also be noted that at block 220 that the regenerative of braking power is directed to one of the high-voltage loads (i.e., the refrigerant compressor 98) alone, and not to any of the low-voltage loads (e.g., the valve 70, pump 78, electric heater 80, fan 84, pump 88, valve 94, fan that directs air across the heat exchanger 92, thermal expansion valve 104, first fan 106, second fan 108, vehicle lights, radio, heated windscreens, etc.).

Returning to block 218, if the regenerative braking power does exceed the power output limit of the refrigerant compressor 98, the method 200 moves on to block 222 where the regenerative braking power is directed to the refrigerant compressor 98 and one or more of the low-voltage loads (e.g., the valve 70, pump 78, fan 84, pump 88, valve 94, fan that directs air across the heat exchanger 92, thermal expansion valve 104, first fan 106, second fan 108, vehicle lights, radio, heated windscreens, etc.), but not to the electric heater 80. The combination of the refrigerant compressor 98 and the one or more low-voltage loads at block 222 may utilize all of the regenerative braking power. The selection of which low-voltage loads may be dependent on the amount of regenerative braking power that is in excess of what the refrigerant compressor 98 is capable of consuming.

Returning to block 216, if the ambient air temperature is not greater than the second threshold (i.e., the ambient air temperature has a value that is between the first threshold and the second threshold), the method 200 moves on to block 224 where it is determined if the regenerative braking power is sufficient to operate both the electric heater 80 and the compressor 98. If it is determined that the regenerative braking power is not sufficient to operate both the electric heater 80 and the compressor 98, the method 200 moves on to block 226 where regenerative braking power is cycled between being directed to the electric heater 80 and the compressor 98 in order to adjust/maintain a temperature of the battery 20 to within a desirable range (e.g., within a desirable range between a minimum and a maximum operating temperature where the functionality of the battery 20, e.g., the ability of the battery to store a charge, the discharge power output limits of the battery, the discharge current limits of the battery, etc., is not significantly deteriorated). More specifically, the electric heater 80 may be operated to heat the battery 20 via the coolant within cooling system 62 when the temperature of the battery 20 is approaching a minimum operating temperature and the compressor 98 may be operated to cool the battery 20 via the coolant within cooling system 62 when the temperature of the battery 20 is approaching a maximum operating temperature.

Also at block 226, if the regenerative braking power exceeds the power output limit of which of the electric heater 80 or the refrigerant compressor 98 that is being operated, the regenerative braking power that is in excess of the power output limit of the electric heater 80 or the refrigerant compressor 98 may be directed to one or more of the low-voltage loads (e.g., the valve 70, pump 78, fan 84, pump 88, valve 94, fan that directs air across the heat exchanger 92, thermal expansion valve 104, first fan 106, second fan 108, vehicle lights, radio, heated windscreens, etc.).

Returning to block 224, if it is determined that the regenerative braking power is sufficient to operate both the electric heater 80 and the compressor 98, the method 200 moves on to block 228 where it is determined if the temperature of the battery 20 is within the desired range (e.g., within a desirable range between a minimum and a maximum operating temperature where the functionality of the battery 20, e.g., the ability of the battery to store a charge, the discharge power output limits of the battery, the discharge current limits of the battery, etc., is not significantly deteriorated). If the temperature of the battery 20 is not within the desired range, the method 200 moves on to block 226. If the temperature of the battery 20 is within the desired range, the method 200 moves on to block 230, where the regenerative braking power is directed to the refrigerant compressor 98 and the electric heater 80.

Also at block 230, if the regenerative braking power exceeds the combined power output limit of the electric heater 80 and the refrigerant compressor 98, the regenerative braking power that is in excess of the combined power output limit of the electric heater 80 and the refrigerant compressor 98 may be directed to one or more of the low-voltage loads (e.g., the valve 70, pump 78, fan 84, pump 88, valve 94, fan that directs air across the heat exchanger 92, thermal expansion valve 104, first fan 106, second fan 108, vehicle lights, radio, heated windscreens, etc.). Then method 200 then recycles back to the beginning of block 228.

It should be understood that the flowchart in FIGS. 3A and 3B is for illustrative purposes only and that the method 200 should not be construed as limited to the flowchart in FIGS. 3A and 3B. Some of the steps of the method 200 may be rearranged while others may be omitted entirely. For example, blocks 202, 204, 206, 224, 226, 228, and 230 may be a separate method (the only difference from FIGS. 3A and 3B being that block 204 is input directly into block 224 in response to a "yes" condition at block 204) that is configured to directed regenerative braking power to either the electric heater 80 and/or the refrigerant compressor 98 to either heat or cool the coolant within cooling system 62 in order to heat or cool the battery 20 to maintain the temperature of the battery 20 within the desired range, regardless of the ambient air temperature.

At low ambient air temperatures (i.e., temperatures that are less than the lower threshold described above, which may be temperatures that are less than approximately 4° C.), it may be advantageous to direct the regenerative braking to the electric heater 80 as opposed to the refrigerant compressor 98 when dissipating excess regenerative braking energy because it is likely that the vehicle operator may require cabin heating as opposed to cabin cooling, that the battery 20 will require heating as opposed to cooling, and under such cold conditions, the chiller 90 and the evaporator 102 tend to freeze over affecting the functionality of the chiller 90 and the evaporator 102 (e.g., decreasing the ability to transfer heat).

At high ambient temperatures (i.e., temperatures that are greater than the upper threshold described above, which may be temperatures that are greater than approximately 25° C.), it may be advantageous to direct the regenerative braking to the refrigerant compressor 98 as opposed to the electric heater 80 when dissipating excess regenerative braking energy because it is likely that the vehicle operator may require cabin cooling as opposed to cabin heating, that the battery 20 will require cooling as opposed to heating, and under such warm conditions, the amount of energy that the electric heater 80 is able to consume decreases (i.e., as temperature increases the energy consumption of the electric heater 80 decreases). Therefore, the electric heater 80 may be unable to effectively dissipate the excess regenerative braking when the battery 20 is experiencing an unchargeable condition at high ambient temperatures.

At ambient temperatures between the lower and upper thresholds the electric heater 80 and refrigerant compressor 98 are both able to function properly and effectively dissipate regenerative braking energy. Therefore, at ambient temperatures between the lower and upper thresholds it may be advantageous to utilize both the electric heater 80 and the refrigerant compressor 98 to maximize the amount of regenerative braking energy that may be dissipated.

The method 200 may be particularly advantageous in BEV vehicles that do not include an internal combustion to propel the vehicle (i.e., vehicles that only include one or more battery powered electric machines that operate as a motor to propel the vehicle and as a generator to charge the battery). In conventional or hybrid vehicle that include engines, the engine may be used to slow down a vehicle. Such a process is known as engine braking. Engine braking may be desirable in vehicles that include that include an engine, because the engine is designed to spin and therefore may be utilized to brake the vehicle without concern for excessive wear and tear of the engine. Engine braking would alleviate the need to operate the refrigerant compressor 98, the electric heater 80, any other electrical load, or to thermal cycle (i.e., the transferring of heat to and from) the battery 20 via the refrigerant compressor 98 and the electric heater 80. On the other hand, if the vehicle does not include an engine, or if there are other concerns in spinning the engine, such as noise, vibration, and harshness (NVH) issues, then utilizing electrical loads (such as the electric heater 80, the refrigerant compressor 98, and/or any other electrical load) to dissipate excess regenerative braking energy becomes desirable.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
 an electric machine configured to charge a battery via regenerative braking;

a coolant circuit having an electric heater;
a refrigerant circuit having an electric compressor; and
a controller programmed to,
 responsive to a capacity of the battery to receive power being less available regenerative braking power and ambient air temperature being less than a first threshold, direct regenerative braking power to the heater but not the compressor, and
 responsive to the capacity of the battery to receive power being less available regenerative braking power and ambient air temperature exceeding a second threshold greater than the first threshold, direct regenerative braking power to the compressor but not the heater.

2. The vehicle of claim 1, wherein the controller is further programmed to, responsive to the capacity of the battery to receive power being less available regenerative braking power, and ambient air temperature exceeding the first threshold but not the second threshold, cycle regenerative braking power between the heater and the compressor to maintain a battery temperature within a desired operating range.

3. The vehicle of claim 1, wherein the coolant circuit includes a heat exchanger and a fan configured to direct air across the heat exchanger, and wherein the controller is further programmed to, responsive to the capacity of the battery to receive power being less available regenerative braking power, ambient air temperature being less than the first threshold, and regenerative braking power exceeding a power limit of the heater, direct regenerative braking power to the heater and the fan.

4. The vehicle of claim 1, wherein the coolant circuit includes a heat exchanger and a fan configured to direct air across the heat exchanger, and wherein the controller is further programmed to, responsive to the capacity of the battery to receive power being less available regenerative braking power, ambient air temperature exceeding the second threshold, and regenerative braking power exceeding a power limit of the compressor, direct regenerative braking power to the compressor and the fan.

5. The vehicle of claim 1, wherein the coolant circuit includes a pump configured to circulate coolant, and wherein the controller is further programmed to, responsive to the capacity of the battery to receive power being less available regenerative braking power, ambient air temperature being less than the first threshold, and regenerative braking power exceeding a power limit of the heater, direct regenerative braking power to the heater and the pump.

6. The vehicle of claim 1, wherein the coolant circuit includes a pump configured to circulate coolant, the refrigerant circuit includes a chiller configured to cool the coolant within the coolant circuit, and the controller is further programmed to, responsive to the capacity of the battery to receive power being less available regenerative braking power, ambient air temperature exceeding the second threshold, and regenerative braking power exceeding a power limit of the compressor, direct regenerative braking power to the compressor and the pump.

7. A vehicle comprising:
an electric machine configured to charge a battery during regenerative braking;
an electric heater;
a refrigerant compressor; and
a controller programmed to,
 responsive to ambient air temperature being less than a lower threshold and an unchargeable condition of the battery, direct regenerative braking power to the heater, and
 responsive to ambient air temperature exceeding an upper threshold and presence of the condition, direct regenerative braking power to the compressor.

8. The vehicle of claim 7, wherein the controller is further programmed to, responsive to presence of the condition, and ambient air temperature exceeding the lower threshold but not the upper threshold, cycle regenerative braking power between the heater and the compressor to maintain a battery temperature within a desired operating range.

9. The vehicle of claim 7, wherein the condition is a battery charge that exceeds a charge limit.

10. The vehicle of claim 7 further comprising a coolant circuit that is in fluid communication with and configured to heat or cool the battery, the coolant circuit including the electric heater and a pump configured to circulate coolant through the coolant circuit and to the battery, a refrigerant circuit that includes the compressor and a chiller that is configured to transfer heat from the coolant circuit to the refrigerant circuit.

11. The vehicle of claim 10, wherein the controller is further programmed to, responsive to presence of the condition, ambient air temperature being less than the lower threshold, and regenerative braking power exceeding a power limit of the heater, direct regenerative braking power to the heater and the pump.

12. The vehicle of claim 10, wherein the controller is further programmed to, responsive to presence of the condition, ambient air temperature exceeding the upper threshold, and regenerative braking power exceeding a power limit of the compressor, direct regenerative braking power to the compressor and the pump.

13. The vehicle of claim 7 further comprising a refrigerant circuit that includes an evaporator, a condenser, and the compressor, a first fan that is configured to direct air across the evaporator to cool a vehicle cabin, and second fan that is configured to direct air across the condenser to reject heat from the refrigerant circuit to the ambient surroundings.

14. The vehicle of claim 13, wherein the controller is further programmed to, responsive to presence of the condition, ambient air temperature exceeding the upper threshold, and regenerative braking power exceeding a power limit of the compressor, direct regenerative braking power to the compressor and the second fan.

15. The vehicle of claim 7 further comprising a coolant circuit that includes the electric heater and a heat exchanger, and a fan that is configured to direct air across the heat exchanger to heat a cabin, and wherein the controller is further programmed to, responsive to presence of the condition, ambient air temperature being less than the lower threshold, and regenerative braking power exceeding a power limit of the compressor, direct regenerative braking power to the heater and the fan.

16. A vehicle comprising:
an electric machine configured to generate electric power during regenerative braking;
an electric heater;
a refrigerant compressor; and
a controller programmed to,
 responsive to ambient air temperature being less than a first threshold, direct regenerative braking power to the heater but not the compressor, and responsive to ambient air temperature exceeding a second threshold greater than the first threshold, direct regenerative braking power to the compressor but not the heater.

17. The vehicle of claim 16, wherein the controller is further programmed to, responsive to ambient air temperature exceeding the first threshold and being less the second threshold, direct regenerative braking power to the heater and the compressor.

18. The vehicle of claim 16, wherein the controller is further programmed to,
responsive to directing regenerative braking power to the heater but not the compressor and regenerative braking power exceeding a power limit of the heater, direct the regenerative braking power that exceeds the power limit of the heater to one or more secondary loads, and
responsive to a directing regenerative braking power to the compressor but not the heater and regenerative braking power exceeding a power limit of the compressor, direct the regenerative braking power that exceeds the power limit of the compressor to the one or more secondary loads.

19. The vehicle of claim 16 further comprising a battery, and wherein the controller is programmed to direct regenerative braking power to recharge the battery at any ambient temperature responsive to a charge of the battery being less than a charge threshold.

20. The vehicle of claim 19 further comprising a coolant circuit that is in fluid communication with and configured to heat or cool the battery, the coolant circuit including the electric heater and a pump, a refrigerant circuit that includes the compressor and a chiller that is configured to transfer heat from the coolant circuit to the refrigerant circuit.

* * * * *